US008874915B1

(12) United States Patent
Rodoper et al.

(10) Patent No.: US 8,874,915 B1
(45) Date of Patent: Oct. 28, 2014

(54) OPTIMIZED ENCRYPTION KEY EXCHANGE

(75) Inventors: Mete Rodoper, Sunnyvale, CA (US);
Kiran K. Edara, Cupertino, CA (US)

(73) Assignee: Amazon Technologies, Inc., Reno, NV (US)

( * ) Notice: Subject to any disclaimer, the term of this patent is extended or adjusted under 35 U.S.C. 154(b) by 344 days.

(21) Appl. No.: 13/247,852

(22) Filed: Sep. 28, 2011

(51) Int. Cl.
*H04L 29/06* (2006.01)
*H04L 9/08* (2006.01)

(52) U.S. Cl.
CPC ............ *H04L 9/0838* (2013.01); *H04L 63/061* (2013.01); *H04L 9/0847* (2013.01); *H04L 9/0844* (2013.01); *H04L 9/0841* (2013.01)
USPC ........... 713/171; 713/170; 713/182; 713/189; 455/410; 455/432.1; 380/30; 380/278; 726/29

(58) Field of Classification Search
CPC ..... H04L 9/0844; H04L 9/0847; H04L 9/088; H04L 63/0435; H04L 63/0442; H04L 63/045; H04L 63/061; H04L 9/0838; H04L 9/0841
USPC ................ 713/189, 170, 171, 168, 201, 182; 455/410, 432.1; 380/277, 278, 30; 726/29
See application file for complete search history.

(56) References Cited

U.S. PATENT DOCUMENTS

| | | | |
|---|---|---|---|
| 7,936,870 B2 * | 5/2011 | Hauge et al. ...................... 380/30 |
| 8,161,295 B2 * | 4/2012 | Honkanen et al. ............. 713/192 |
| 2004/0151308 A1 * | 8/2004 | Kacker et al. ................... 380/30 |
| 2005/0287990 A1 * | 12/2005 | Mononen et al. ............. 455/411 |
| 2007/0283151 A1 * | 12/2007 | Nakano et al. ................. 713/168 |
| 2008/0118061 A1 * | 5/2008 | Yang et al. ..................... 380/200 |
| 2008/0130899 A1 * | 6/2008 | Iwamoto et al. .............. 380/278 |
| 2008/0301459 A1 * | 12/2008 | Ebeid ............................. 713/180 |
| 2009/0034726 A1 * | 2/2009 | Williams et al. .............. 380/258 |
| 2010/0153227 A1 * | 6/2010 | Medvinsky et al. ............ 705/26 |
| 2010/0169646 A1 * | 7/2010 | Zhang et al. .................. 713/171 |
| 2010/0281262 A1 * | 11/2010 | Cheng et al. .................. 713/171 |
| 2011/0015864 A1 * | 1/2011 | Halpern et al. ................. 702/19 |
| 2012/0155645 A1 * | 6/2012 | Prochaska et al. ............ 380/278 |
| 2012/0221858 A1 * | 8/2012 | Struik ........................... 713/171 |
| 2012/0226611 A1 * | 9/2012 | Radia et al. ..................... 705/44 |
| 2012/0246480 A1 * | 9/2012 | Selander et al. .............. 713/168 |
| 2013/0058484 A1 * | 3/2013 | Delagrange et al. .......... 380/255 |

OTHER PUBLICATIONS

Baek et al., "A Survey of Identity-Based Cryptography," 2004, pp. 1-10, http://www.jan.newmarch.name/publications/auug_id_survey.pdf.*
Boneh, Dan et al. (2003). "Identity-Based Encryption from the Well Pairing," SIAM J. of Computing, 32(3):586-615.
Martin, Luther (Aug. 2008). "Indentity-Based Encryption Comes of Age," located at www.computer.org/security/podcasts, pp. 93-95.

(Continued)

*Primary Examiner* — Hadi Armouche
*Assistant Examiner* — Hee Song
(74) *Attorney, Agent, or Firm* — Lowenstein Sandler LLP

(57) ABSTRACT

An encryption key module in a content providing server receives a request to stream electronic media data to the user device. The encryption key module identifies a predefined shared secret key corresponding to a key in a subscriber identity module (SIM) in the user device. The predefined shared secret key is used for encryption of data. The encryption key module encrypts the requested electronic media data based on the shared secret key and provides the encrypted electronic media data to the user device over a wireless network.

35 Claims, 8 Drawing Sheets

(56) References Cited

OTHER PUBLICATIONS

Shamir, Adi (1998). "Identity-Based Cryptosystems and Signature Schemes".

Bethencourt, John et al. "Ciphertext-Policy Attribute-Based Encryption." IEEE Symposium on Security and Privacy, 2007. May 20-23, 2007.

* cited by examiner

OPTIMIZED ENCRYPTION KEY EXCHANGE

BACKGROUND OF THE INVENTION

A large and growing population of users enjoys entertainment through the consumption of media items, including electronic media, such as electronic books (also referred to herein as ebooks), electronic newspapers, electronic magazines, other electronic publications, audio books, and digital video. Users employ various electronic devices to consume such media items. Among these electronic devices are electronic book readers, cellular telephones, personal digital assistants (PDAs), portable media players, tablet computers, electronic pads, netbooks, desktop computers, notebook computers, and the like.

One common method of obtaining these electronic media items, such as digital video, is by downloading or streaming the digital video from a content provider over a network. Downloading and streaming both include receiving media data on a local system from a remote system, however, streaming generally indicates that the media data is used nearly immediately as it is received (while the transmission is still in progress) and may not be stored long-term, whereas downloading implies that the media data is only usable when it is received in its entirety. In order to provide a high quality service to the user, one goal is to achieve a secure connection between the service provider and the user device while minimizing the use of resources such as time and network bandwidth.

Many current streaming or download services, over both wired and wireless connections, base their security on application layer security, such as Hypertext Transfer Protocol Secure (HTTPS), Transport Layer Security (TLS), or Secure Sockets Layer (SSL). Forming secure channels using these protocols increases the overhead on the system, as multiple communications may be sent between the user device and the content provider. For example, the user device may send a request to stream a digital video and the content provider may have to authenticate the user, generate a unique encryption key, and send the encryption key back to the user device. The user device may acknowledge receipt of the encryption key, and only then does the content provider encrypt the digital video with the encryption key and start streaming the encrypted video data to the user device. These multiple exchanges may introduce a significant time delay between when the user requests the digital video and when he receives usable data and also take up valuable bandwidth. These factors may be of particular concern in wireless communications systems.

BRIEF DESCRIPTION OF THE DRAWINGS

The present invention will be understood more fully from the detailed description given below and from the accompanying drawings of various embodiments of the present invention, which, however, should not be taken to limit the present invention to the specific embodiments, but are for explanation and understanding only.

DETAILED DESCRIPTION OF THE PRESENT INVENTION

Figure 1:
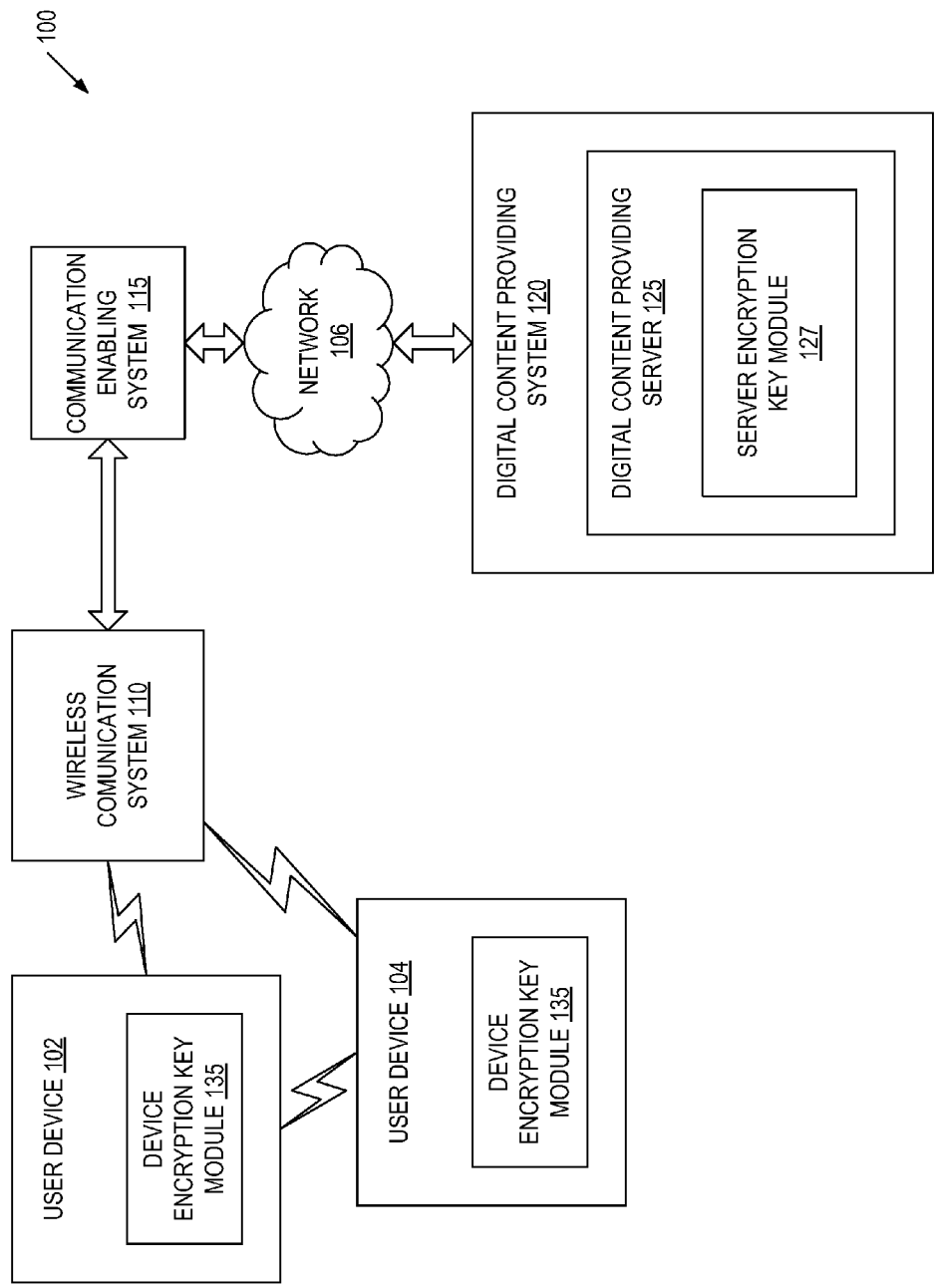
FIG. 1 is a block diagram of an exemplary network architecture, in which embodiments of the present invention may operate.

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

Embodiments of a method and apparatus are described for an optimized encryption key exchange for securely transmitting electronic media data. In one embodiment, for example, a wireless user device and a video server may agree to a predefined shared secret key for use in secure streaming of digital video data. The shared secret key may be for example, a GSM, UMTS or LTE encryption key from a subscriber identity module (SIM) in the user device, a unique hardware serial number of the device, an international mobile subscriber identity number of the device, etc. The key may be stored on the video server when the wireless device is activated or shipped to the user. When the wireless device sends a streaming request to the video server, the video server may authenticate and/or validate the user and encrypt video streaming packets using the predefined shared secret key, as will be described below. Since the wireless device also has the key, it can decrypt the video packets and begin playback.

In one embodiment, an encryption key module in a user device determines a predefined shared secret key from the SIM. The predefined shared secret key is used for encryption of electronic media data. The user device generates a request to stream electronic media data to the user device, and sends the request sent to a content providing server. Over a wireless network, the user device receives the requested electronic media data from the content providing server. The received electronic media data is encrypted based on the predefined shared secret key and can be decrypted using the shared secret key known to the user device.

In one embodiment, the shared secret key may be determined according to a shared secret key policy. The shared secret key policy may include, for example, a plurality of keys and a defined order that the keys are to be used for subsequent requests on a rotating basis. The shared secret key policy may also select the shared secret key from the plurality of keys based on a time the request was made or based on a location from which the request was made.

The request to download or stream electronic media data may include a device public key and an identifier of the shared secret key. The device public key may include a human readable string of concatenated information, such as an identifier of a user making the request, an identifier of an application used to stream the electronic media data, an identifier of the electronic media data, an indication of the time the request was made, and an identifier of the user device making the request. The identifier of the shared secret key may include an identifier of a profile where the shared secret key is stored on the content providing server.

The encryption key module in the user device may generate a device private key from the device public key and the shared secret key, for example by combining the device public key and the shared secret key using an elliptic curve operation. Using a server public key, which is either received from the content providing server or estimated based on a known format, the encryption key module may generate a traffic encryption key by combining the device private key and the server public key using a key exchange cryptography technique. This traffic encryption key is used to decrypt the encrypted electronic media data received from the content providing server.

In one embodiment, the traffic encryption key is a symmetrical key and the optimized encryption key exchange techniques described herein do not require the exchange of encryption keys between the user device and the content providing server. The content providing server encrypts the electronic media data with a similar encryption key formed from a server private key, which is based on the shared secret key, and the device public key received with the request. The device public key is the only piece of information that needs to be communicated between the user device and the content providing server and the content providing server can begin securely streaming or otherwise transmitting encrypted data without the need to exchange any other encryption keys. This reduces the amount of time delay that a user experiences between selecting a media item and the actual beginning of the playback of that media item. Conventional encryption key exchange techniques using HTTPS, TLS, SSL, etc. may take approximately 500 milliseconds to 2.5 seconds depending on the data throughput rate available on the wireless device. The optimized techniques described herein can reduce that delay, possibly by several seconds. Also since conventional key exchanges messages can be as large as 4000 bytes, the techniques described herein also reduce the needed bandwidth for exchanging encryption keys, which may be limited, especially in a wireless communications system.

FIG. 1 is a block diagram of an exemplary network architecture 100, in which embodiments of the present invention described herein may operate. The network architecture 100 may include a digital content providing system 120 and one or more user devices 102, 104 capable of communicating with the digital content providing system 120 via a network 106. Network 106 may include, for example, a public network such as the Internet or a private network such as a local area network (LAN) and may include a wired or wireless network.

The user devices 102, 104 may be portable computing devices such as electronic book readers or tablet computers (e.g., that include a book reader application). Other examples of portable computing devices include cellular telephones, personal digital assistants (PDAs), portable media players, netbooks, and the like. The user devices 102, 104 may also be non-portable computing devices such as a desktop computer, a set-top box associated with a television, a gaming console, and so on. The user devices 102, 104 are variously configured with different features to enable consumption of one or more types of digital content and electronic media items. The digital content and electronic media items may include electronic books (ebooks) and/or other electronic publications (electronic versions of publications) such as electronic magazines, digital newspapers, digital audio books, electronic journals, real simple syndication (RSS) feeds, etc. The media items may also include digital video (e.g., movies, television, short clips, etc.) which may be available from a video-on-demand (VOD) service, images (e.g., art, photographs, etc.), and multi-media content.

The digital content providing system 120 may correspond to any feature or combination of features for providing electronic media items or other digital content to the user devices 102, 104. The digital content providing system 120 may include a network-accessible server-based functionality (digital content providing server 125), various data stores (not shown), and/or other data processing equipment. The digital content providing system 120 may be implemented by a single machine or a cluster of machines. The digital content providing system 120 may include one or more machines (e.g., one or more server computer systems, routers, gateways, etc.) that have processing and storage capabilities to provide the server-based functionality.

In one embodiment, the digital content providing server 125 corresponds to an entity which provides electronic media items (e.g., electronic books, videos) to users upon the users' purchase of the items. In this role, the digital content providing server 125 may essentially act as a bookseller or the like. In other cases, the digital content providing server 125 corresponds to an entity which provides electronic publications to users on a non-fee basis or on the basis of some other type of alternative compensation arrangement. Thus, the term a "provider" of items should be construed broadly to encompass educational institutions, governmental organizations, libraries, non-profit organizations, retailers, auction services, and so on, or some cooperative combination of any two or more entities.

The digital content providing server 125 may deliver, and the user devices 102, 104 receive, electronic publications (or other media items), search results, upgrades, and/or other information via the network 106. For example, the user devices 102, 104 may download, stream, or otherwise receive digital video from the digital content providing server 125. The digital content providing server 125 may also receive various requests (e.g., search queries), instructions and other data from the user devices 102, 104 via the network 106.

Communication between the user devices 102, 104 and the item providing system 120 may be enabled via any communication infrastructure. One example of such an infrastructure includes a combination of a wide area network (WAN) and wireless infrastructure, which allows a user to use the user devices 102, 104 to purchase digital content (e.g., digital video or electronic publications) and consume the digital content without being tethered to the digital content providing system 120 via hardwired links. The wireless infrastructure may be provided by one or multiple wireless communications systems, such as wireless communication system 110. In one embodiment, wireless communication system 110 may be a wireless fidelity (WiFi) hotspot connected with the network 106. Wireless communication system 110 may also be a wireless carrier system that can be implemented using various data processing equipment, communication towers, etc. For example, wireless communication system 110 may include a Global System for Mobile Communications (GSM) network, a Universal Mobile Telecommunications System (UMTS) system, a 3GPP Long Term Evolution (LTE) system, or other system. Alternatively, or in addition, the wireless carrier system may rely on satellite technology to exchange information with the user devices 102, 104.

The communication infrastructure may also include a communication-enabling system 115 that serves as an intermediary in passing information between the digital content providing system 120 and the wireless communication system 110. The communication-enabling system 115 may communicate with the wireless communication system 110 (e.g., a wireless carrier) via a dedicated channel, and may communicate with the digital content providing system 120 via a non-dedicated communication mechanism, (e.g., a public Wide Area Network (WAN) such as the Internet).

In addition to wirelessly connecting to wireless communication system 110, user devices 102, 104 may also wirelessly connect to other user devices 102, 104. For example, user device 102 may form a wireless ad hoc (peer-to-peer) network with user device 104 using WiFi, Bluetooth, or other wireless communication protocols.

In one embodiment, user devices 102, 104 each include a device encryption key module 135. Device encryption key module 135 may allow for decryption of electronic media data using a shared secret key without the need to exchange encryption keys with digital content providing server 125. In one embodiment, device encryption key module 135 may determine a predefined shared secret key from a secure location, such as a subscriber identity module (SIM) in the user device. The module 135 generates a request to stream electronic media data to the user device 102, 104, and sends the request to digital content providing server 125. Over wireless network 106, the user device 104 may receive the requested electronic media data from the content providing server 125. The received electronic media data is encrypted based on the predefined shared secret key and can be decrypted using the shared secret key known to the device encryption key module 135. Additional details of the device encryption key module 135 are provided below.

In one embodiment, digital content providing server 125 includes server encryption key module 127. Server encryption key module 127 may encrypt the requested electronic media data using the shared secret key and provide the data to user device 102, 104. Server encryption key module 127 may store the shared secret key in a server profile on digital content providing server 125 before the device is provided to a user. Additional details of the server encryption key module 127 are provided below.

Figure 2:
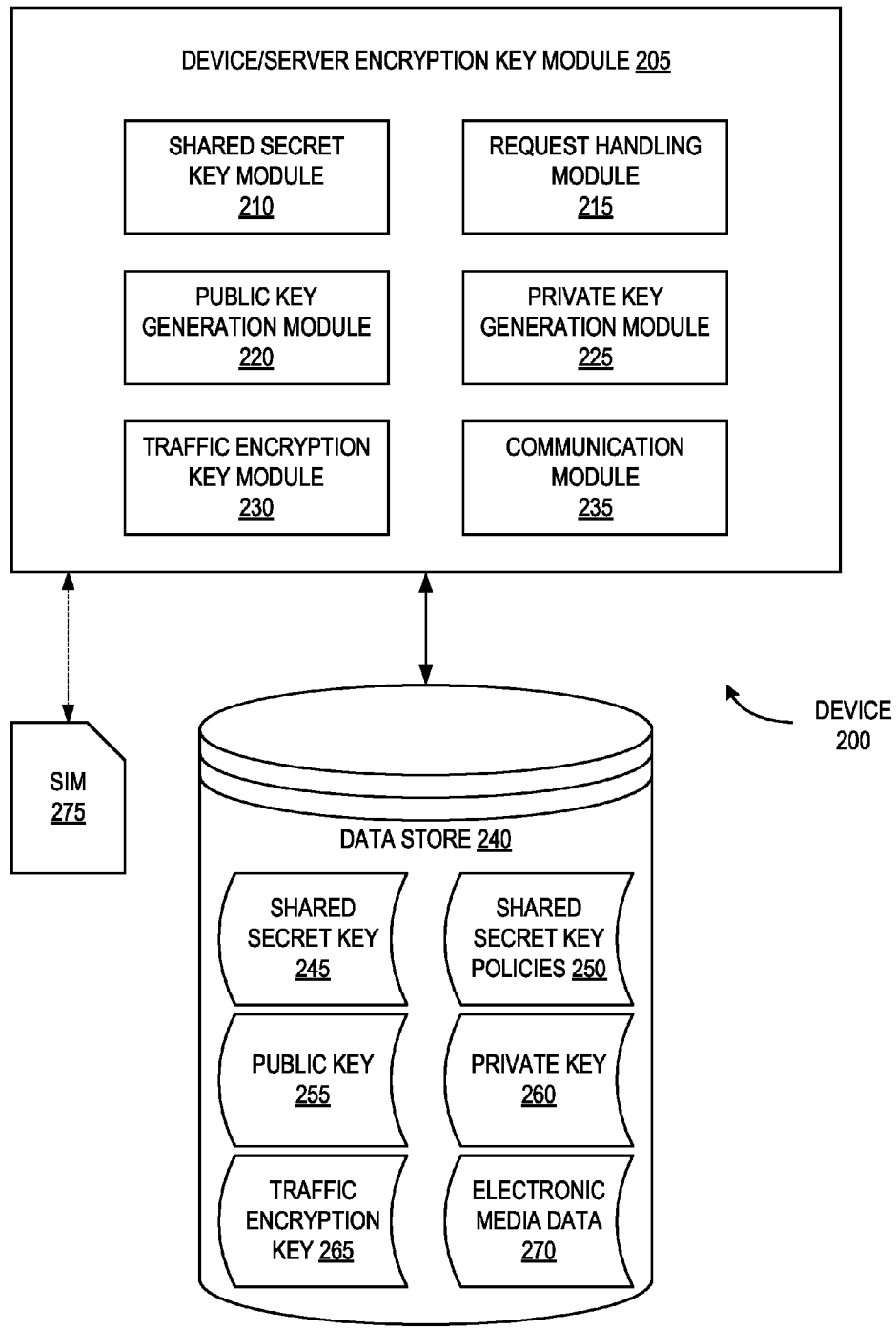
FIG. 2 is a block diagram illustrating an encryption key module, according to an embodiment.

FIG. 2 is a block diagram of one embodiment of an encryption key module 205 that is included in a device 200. Encryption key module 205 may correspond to device encryption key module 135 or server encryption key module 127 of FIG. 1. In one embodiment, device 200 may be representative of user device 102, 104 or digital content providing server 125 of FIG. 1, and may include encryption key module 205. In one embodiment, encryption key module 205 may include shared secret key module 210, request handling module 215, public key generation module 220, private key generation module 225, traffic encryption key module 230, and communication module 235. In one embodiment, encryption key module 205 is connected to a data store 240, which may be a file system, database or other data management layer resident on a data storage device such as a disk drive, RAM, ROM, database, etc.

Shared secret key module 210 may identify a shared secret key that is known to both user device 104 and digital content providing server 125. In one embodiment, the shared secret key may be obtained from a subscriber identity module (SIM) stored on a SIM card 275 of user device 104. Shared secret key module 210 may store the key value as shared secret key 245 in data store 240. In one embodiment, where the user device 104 is manufactured or provided by a same entity that owns or manages digital content providing server 125, the shared secret key 245 may be obtained and recorded in a server profile associated with the device (and identified by a profile identifier) before the user device 104 is shipped to the user. In other embodiments, the shared secret key 245 may be communicated from the user device 104 to the digital content providing server 125 at some point in time other than accompanying a request for electronic media data, such as when registering the user device 104. The shared secret key module 210 of server encryption key module 127 may receive the profile identifier (accompanying a request for media data) and use the profile identifier to determine the shared secret key 245.

The SIM 275 may include a number of different key values which may be used as shared secret key 245 for the purposes of this invention. The key values may be defined according to a standard (e.g., the $3^{rd}$ Generation Partnership Project (3GPP)) and may be stored on the SIM card 275 in such a way that they are not accessible by the user. Some examples of the key values from the SIM 275 that may be used as shared secret key 245 include: $EF_{IMSI}$ which contains an International Mobile Subscriber Identity (IMSI), $EF_{Keys}$ which contains a ciphering key (CK), integrity key (IK) and key set identifier (KSI), $EF_{KeysPS}$ which contains a ciphering key for the packet switched domain (CKPS), integrity key (IKPS) and key set identifier (KSIPS), $EF_{Kc}$ which contains a ciphering key Kc and a ciphering key sequence number n for enciphering in a GSM access network, $EF_{KcGPRS}$ which contains a ciphering key for general packet radio server (KcGPRS), or $EF_{EPSNSC}$ which contains an evolved packet system (EPS) non-access stratum (NAS) security context (EPSNCS). One of skill in the art would understand that these are merely examples, and that there are many other values that could be used as shared secret key 245. For example, the key value may be some other key from the SIM 275 or may be some other secured value known to both user device 104 and content providing server 125.

In one embodiment, one key value may be designated as shared secret key 245. In other embodiments, however, the shared secret key 245 may be chosen from a set of possible values according to a policy known to both user device 104 and content providing server 125. The policy may be stored, for example, as shared secret key policies 250 in data store 240. In one embodiment, the policy 250 may define an order that the keys are to be used in, such that a different value is used as the shared secret key for each subsequent media data request on a rotating basis. The policy may also select a value for shared secret key 245 depending on some factor, such as time or location. For example, if a request for electronic media data is made during a certain period of time (e.g., 9:00 am to 12:00 pm) the policy may specify that a certain key value (e.g., $EF_{IMSI}$) is to be used as shared secret key 245. In another example, if the request for electronic media data is made from within a certain distance (e.g., based on GPS positioning) of the user's home, the policy may specify that another key value is to be used. In other embodiments, the shared secret key policies 250 may be defined using any other factors or a combination of these or other factors. The shared secret key policies 250 may be predefined by the manufacturer (e.g., the content provider) and be changed or updated over time, such as by an over-the-air (OTA) update.

Request handling module 215 may be responsible for sending and receiving a request for media data corresponding to an electronic media item. In one embodiment, request handing module 215 may provide a user interface on user device 104 which allows a user to select an electronic media item (e.g., a digital video) for download or streaming. In response to the user selection, request handling module 215 may generate and send a request for the media data to digital content providing server 125. In one embodiment the request for media data may include a device public key and a profile identifier, which may be used to determine the shared secret key 245.

Public key generation module 220 is responsible for generating a public key used in asymmetric encryption of the media data. The public key may be a human readable string including information about the device and the electronic media item associated with the request. For example, the public key may include information such as an identifier of the user (username), an identifier of the application used to download or stream the media data (applicationName), an identifier of the electronic media item (streamName), an indication of the time the request was made (timestamp), an identifier of the user device 104 making the request (deviceSerialNumber), or other information. This information may be concatenated together to form a device public key string Dpub, where Dub={username|applicationName|streamName| timestamp|deviceSerialNumber}. The device public key may be stored as public key 255 in data store 240. The information in public key 255 may be obtained from a data store (not shown) storing information about the user, the device, the applications on the device, a timer (or calendar), etc.

On the server side, public key generation module 220 may generate a similar server public key for digital content providing server 125. For example, the server public key may include information such as an identifier of the content provider (amazon), an identifier of the application used to download or stream the media data (applicationName), an identifier of the electronic media item (streamName), an indication of the time the request was received (timestamp), or other information. This information may be concatenated together to form a content server public key string Apub, where Apub={amazon|applicationName|streamName|timestamp}. This server public key may be stored as public key 255 in data store 240 of digital content providing server 125.

In one embodiment, the asymmetric key formation may also include the formation of a private key for both the user device 104 and the digital content providing server 125. Private key generation module 225 may generate the private key and store it as private key 260 in data store 240. In one embodiment, private key generation module 225 may generate the device private key Dpri and the server private key Apri by combining the respective public keys 255 with the shared secret key 245 using, for example, an elliptic curve operation. The elliptic curve operation may be based on bilinear pairings on an elliptic curve, such as the Weil or Tate pairings. The algebraic structure of elliptic curves over finite fields makes elliptic curve cryptography very secure. Some example elliptic curve operations that may be used include the Elliptic Curve Integrated Encryption Scheme (ECIES), the Elliptic Curve Digital Signature Algorithm, or the Ellpitic Curve Menezes-Qu-Vanstone (ECMQV).

In one embodiment, the device public key 255 is sent from user device 104 to digital content providing server 125 along with the request for electronic media data. Digital content providing server 125 may in turn respond with the server public key 260, however, in another embodiment, public key generation module 225 on the user device 104 may estimate the server public key. Since the server public key is generated using basic public information (similar to that in device public key), if the user device has the information, it can generate the server public key. Public key generation module 225 may be able to determine the server public key based on the known format (e.g., Apub described above) and known server data. Estimating the server public key, saves the time and bandwidth associated with transmitting the server public key from the digital content providing server 125 to the user device 104.

Traffic encryption key module 230 uses the asymmetric key pairs (i.e., public keys 255 and private keys 260) to generate a traffic encryption key (TEK). The traffic encryption key may be used to encrypt and decrypt electronic media data 270 being sent from digital content providing server 125 to user device 104 and may be stored as traffic encryption key 265 in data store 240. In one embodiment, on the user device side, traffic encryption key module 230 combines the device private key Dpri and the server public key Apub using a key exchange cryptography technique such as Diffie Hellman or other key exchange algorithm. The result of this combination is traffic encryption key 265. Traffic encryption key module may use any known symmetrical cryptography technique, such as for example, the Advanced Encryption Standard (AES), the Data Encryption Standard (DES), or some other technique.

One feature of the key exchange cryptography technique used to generate traffic encryption key 265 is that combining the opposite keys will produce the same result. Thus, on the server side, traffic encryption key module 230 may combine the device public key Dpub and the server private key Apri using the same key exchange cryptography technique. The resulting traffic encryption key 265 may be used to encrypt electronic media data 270.

Communication module 235 may be responsible for encrypting/decrypting electronic media data 270 and sending/receiving the encrypted data between digital content providing server 125 and user device 104. Since only the device public key need be shared between user device 104 and digital content providing server 125 (and optionally, the server public key), the transmission of encrypted electronic media data 270 can begin much sooner than when conventional encryption key exchange techniques are used.

Figure 3:
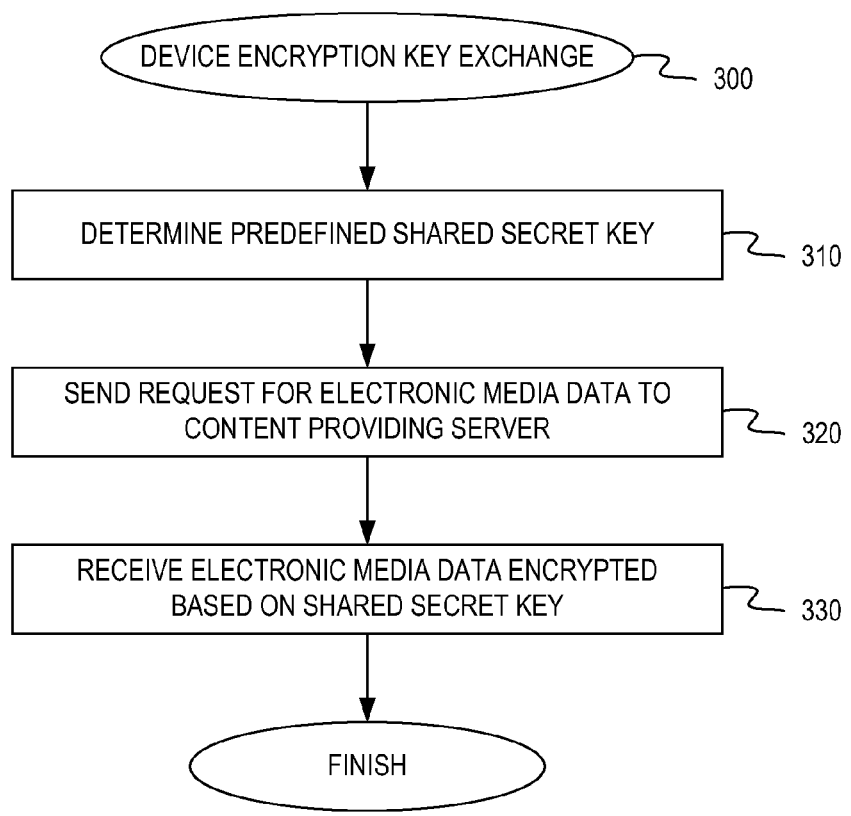
FIG. 3 is a flow diagram illustrating a device encryption key exchange method, according to an embodiment.

FIG. 3 is a flow diagram illustrating a device encryption key exchange method, according to an embodiment of the present invention. The method 300 may be performed by processing logic that comprises hardware (e.g., circuitry, dedicated logic, programmable logic, microcode, etc.), software (e.g., instructions run on a processor to perform hardware simulation), or a combination thereof. The processing logic is configured to optimize an encryption key exchange for a user device 104. In one embodiment, method 300 may be performed by device encryption key module 135 (and 205), as shown in FIGS. 1 (and 2).

Referring to FIG. 3, at block 310, method 300 determines a predefined shared secret key. Shared secret key module 210 may determine the shared secret key 245 from a secure location, such as SIM 275. In one embodiment, the shared secret key may be determined according to shared secret key policy 250, as discussed above. The shared secret key 245 is known to both the user device 104 (as it is present on the SIM 275) and to digital content providing server 125. For example, the shared secret key may be stored in a user profile before the user device is shipped, or the shared secret key 245 may be otherwise communicated to digital content providing server 125.

At block 320, method 300 sends a request for electronic media data to digital content providing server 125. The request may include, for example, a device public key 255 identifying the requested electronic media data 270, the identity of the user and the user device 104, a timestamp, etc. The request may also include a profile number indicating the user profile so that digital content providing server 125 can identify the shared secret key 245 being used by the user device 104. The request and profile number may be transmitted to the digital content providing server 125 by request handling module 215.

At block 330, method 300 receives the requested electronic media data 270 that has been encrypted based on the shared secret key 245. As described above, the encryption may include combining a server public key Apub with the shared secret key 245 using an elliptic curve operation. The resulting server private key Apri may be combined with the device public key Dpub using a key exchange cryptography technique to generate a traffic encryption key 265. Traffic encryption key 265 may be used to encrypt the electronic media data 270. This allows secure communication of the electronic media data 270 with optimized encryption key exchanges. Traffic encryption key module 230 can decrypt the received electronic media data 270 using traffic encryption key 265 and provide the data to the requesting application on user device 104.

Figure 4:
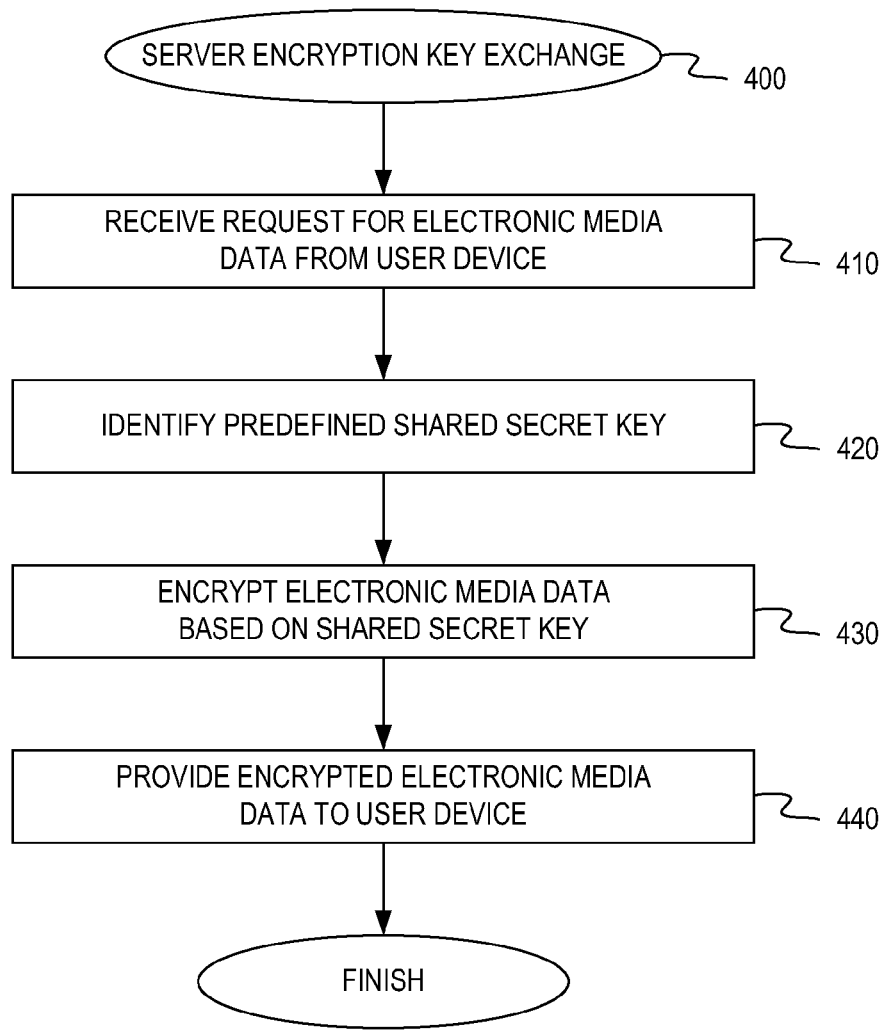
FIG. 4 is a flow diagram illustrating a server encryption key exchange method, according to an embodiment.

FIG. 4 is a flow diagram illustrating a server encryption key exchange method, according to an embodiment of the present invention. The method 400 may optimize an encryption key exchange for a digital content providing server 125. In one embodiment, method 400 may be performed by server encryption key module 127 (and 205), as shown in FIGS. 1 (and 2).

Referring to FIG. 4, at block 410, method 400 receives a request for electronic media data from a user device 104. The request may include, for example, a device public key 255 identifying the requested electronic media data 270, the identity of the user and the user device 104, a timestamp, etc. The request may also include a profile number indicating the user profile so that digital content providing server 125 can identify the shared secret key 245 being used by the user. The request and profile number may be received at the digital content providing server 125 by request handling module 215.

At block 420, method 400 identifies a predefined shared secret key. In one embodiment, the shared secret key 245 be determined from a secure location, such as SIM 275, in user device 104. The shared secret key 245 may be stored in a user profile in digital content server 125 before the user device 104 is shipped, or the shared secret key 245 may be otherwise communicated to digital content providing server 125. In one embodiment, the shared secret key 245 may be provided by a wireless service provider, such as a provider that manages wireless communication system 110. The keys on SIM 275 may be known to the service provider, which may provide the keys to digital content providing server 125 in response to a request. In one embodiment, the shared secret key may be determined by shared secret key module 210 according to shared secret key policy 250, as discussed above. The shared secret key 245 is known to both the user device 104 (as it is present on the SIM 275) and to digital content providing server 125.

At block 430, method 400 encrypts the electronic media data 270 based on shared secret key 245. As described above, private key generation module 225 may combine a server public key Apub with the shared secret key 245 using an elliptic curve operation. Traffic encryption key module 230 may combine the resulting server private key Apri with the device public key Dpub using a key exchange cryptography technique to generate a traffic encryption key 265. Traffic encryption key 265 may be used by communication module 235 to encrypt the electronic media data 270.

At block 440, method 400 provides the encrypted electronic media data to user device 104. Communication module 235 may transmit the requested electronic media data, which was encrypted based on the shared secret key 245 at block 430, to user device 104.

Figure 5:
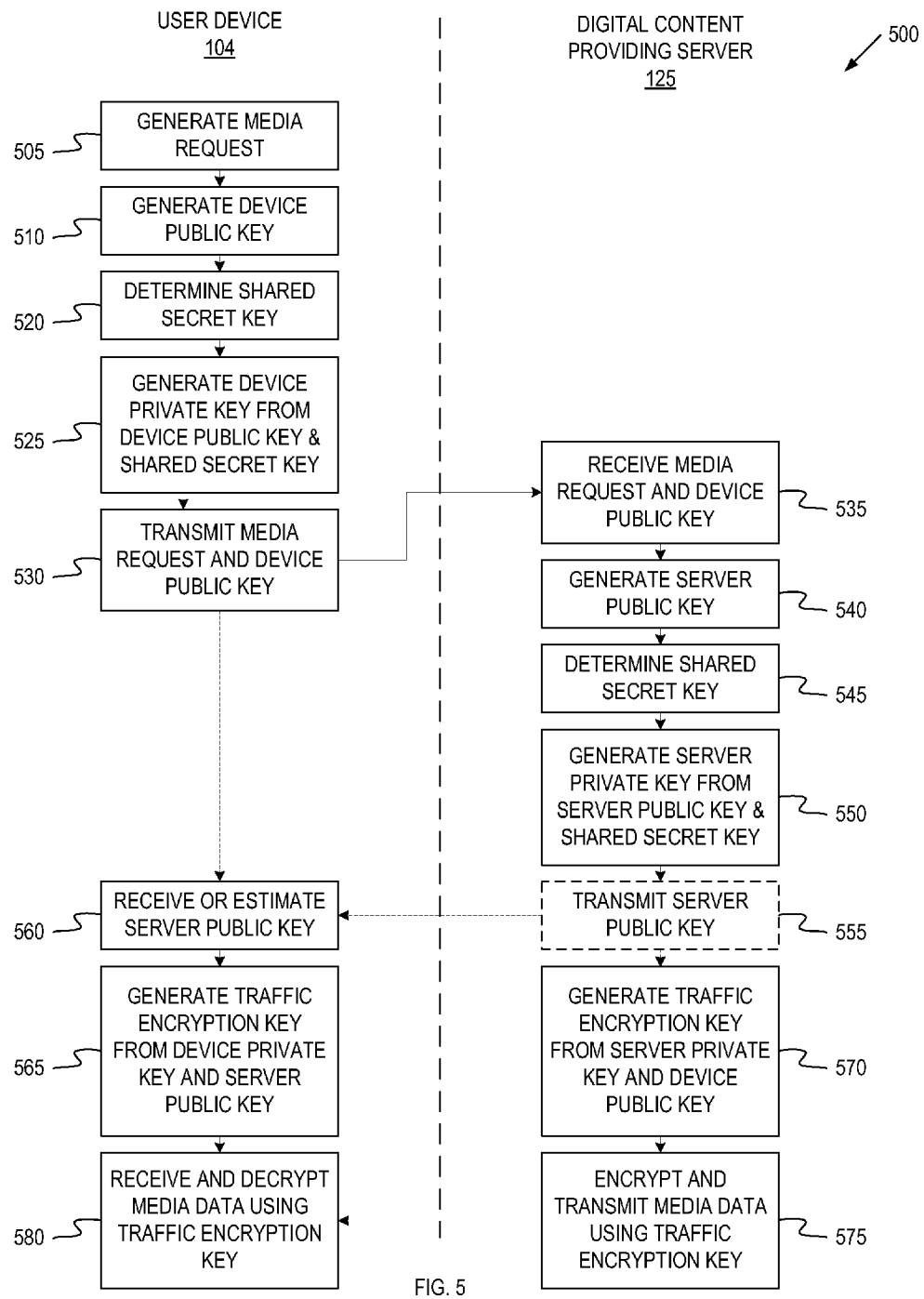
FIG. 5 is a diagram illustrating a workflow for optimized encryption key exchange, according to an embodiment.

FIG. 5 is a diagram illustrating a workflow for optimized encryption key exchange, according to an embodiment of the present invention. Workflow 500 may be performed by device encryption key module 135 on user device 104 and by server encryption key module 127 on digital content providing server 125. For ease of explanation, the blocks indicating the actions performed in workflow 500 are shown under user device 104 on the left and digital content providing server 125 on the right. Arrows between the left and right sides of workflow 500 indicate data or communications sent between user device 104 and digital content providing server 125. The order of the actions described below is merely one possible embodiment, and it should be understood that in other embodiments, the order may change.

At block 505, request handling module 215 generates a request for electronic media data 270 corresponding to an electronic media item. In one embodiment, request handing module 215 may provide a user interface on user device 104 which allows a user to select an electronic media item (e.g., a digital video) for download or streaming. In response to the user selection, request handling module 215 may generate a request for the corresponding media data.

At block 510, public key generation module 220 generates a device public key Dpub. The device public key may be a human readable string including information about the device and the electronic media item associated with the request. The information may be concatenated together to form a device public key string Dpub.

At block 520, shared secret key module 210 determines a shared secret key. In one embodiment, the shared secret key may be a predetermined value selected from a secure source, such as SIM 275 in user device 104. In other embodiments, however, the shared secret key 245 may be chosen from a set of possible values according to a policy 250 known to both user device 104 and content providing server 125. In one embodiment, the policy 250 may define an order that they keys are to be used in, such that a different value is used as the shared secret key for each subsequent media data request on a rotating basis. The policy may also select a value for shared secret key 245 depending on some factor, such as time or location.

At block 525, private key generation module 225 generates a device private key Dpri from the device public key Dpub and the shared secret key. In one embodiment, private key generation module 225 may generate the device private key Dpri by combining Dpub with the shared secret key using an elliptic curve operation. The elliptic curve operation may be based on bilinear pairings on an elliptic curve, such as the Weil or Tate pairings.

At block 530, request handling module 215 transmits the media request and device public key from user device 104 to digital content providing server 125. The request may also include an indication of a server profile (e.g., a profile identifier) where the server profile contains the shared secret key. In other embodiments, the shared secret key 245 may be communicated from the user device 104 to the digital content providing server 125 at some point in time other than accompanying a request for electronic media data, such as when registering the user device 104.

At block 535, request handling module 215 in server encryption key module 127 of digital content providing server 125 receives the media request and device public key. Either in response to receiving the request, or at a prior time, at block 540, public key generation module 220 on digital content providing server 125 generates server public key. For example, the server public key may include information such as an identifier of the content provider, the application used to download or stream the media data, the electronic media item and an indication of the time the request was received. This information may be concatenated together to form a content server public key string Apub.

At block 545, shared secret key module 210 determines the shared secret key for the digital content providing server 125. In one embodiment, the shared secret key may be a predetermined value selected from a secure source, such as SIM 275 in user device 104. In other embodiments, however, the shared secret key 245 may be chosen from a set of possible values according to a policy 250 known to both user device 104 and content providing server 125. The shared secret key module 210 may use a profile identifier received from user device 104 to identify a predetermined shared secret key stored in a server profile associated with the user device 104.

At block 550, private key generation module 225 generates a server private key Apri from the server public key Apub and the shared secret key. In one embodiment, private key generation module 225 may generate the device private key Apri by combining Apub with the shared secret key using an elliptic curve operation. The elliptic curve operation may be the same operation used at block 525 to generate device private key Dpri.

At block 555, communication module 235 optionally transmits the server public key Apub generated at block 540. At block 560, user device 104 receives the server public key Apub. In another embodiment, rather than transmitting the server public key from digital content providing server 125 to user device 104, public key generation module 220 on user device 104 may estimate server public key Apub. Since the server public key is generated using basic public information (similar to that in device public key), if the user device has the information, it can generate the server public key. Public key generation module 225 may be able to determine the server public key based on the known format (e.g., Apub described above) and known server data.

At blocks 565 and 570, the traffic encryption key modules 230 in each of user device 104 and digital content providing server 125 generate a respective traffic encryption key. The traffic encryption key may be used to encrypt and decrypt electronic media data being sent from digital content providing server 125 to user device 104. In one embodiment, traffic encryption key module 230 combines the device private key Dpri and the server public key Apub using a key exchange cryptography technique. The result of this combination is the traffic encryption key 265. Similarly, on the server side, traffic encryption key module 230 combines the server private key Apri and the device public key Dpub using the same key exchange cryptography technique.

At block 575, communication module 235 encrypts the media data using the traffic encryption key generated at block 570. Communication module 235 transmits the encrypted media data to user device 104 over a wired or wireless connection. At block 580, communication module 235 in user device 104 receives the encrypted media data from digital content providing server 125. Communication module 235 may decrypt the media data using the traffic encryption key generated at block 565 and pass the media data to the appropriate application on user device 104.

Figure 6:
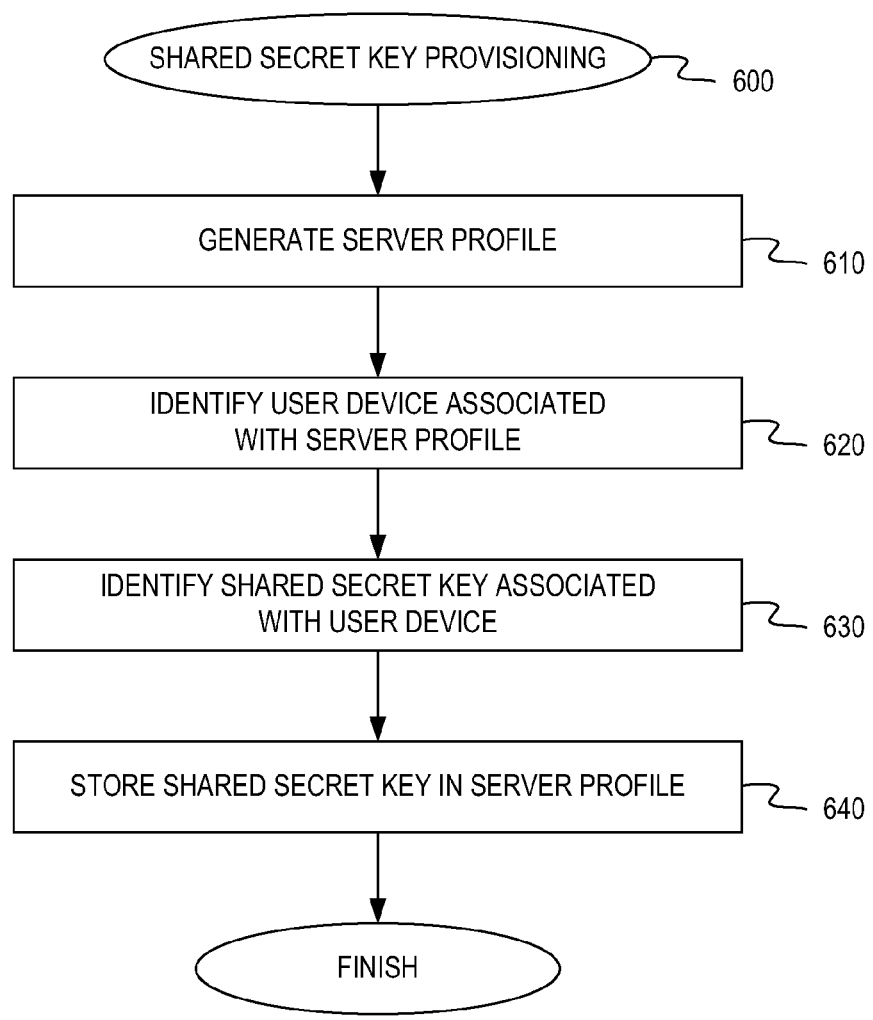
FIG. 6 is a flow diagram illustrating a shared secret key provisioning method, according to an embodiment.

FIG. 6 is a flow diagram illustrating a shared secret key provisioning method, according to an embodiment of the present invention. The method 600 may provision a shared secret key on a digital content providing server 125. In one embodiment, method 600 may be performed by server encryption key module 127 (and 205), as shown in FIGS. 1 (and 2).

Referring to FIG. 6, at block 610, method 600 generates a server profile. Server encryption key module 127 may generate the profile and store it in data store 240. The profile may include storage space for information associated with a particular user or with a particular user device. The profile may include, for example, a username identifying the user for which the profile was created.

At block 620, method 600 identifies a user device, such as user device 104, associated with the server profile. The user device 104 may be associated with the profile when it is purchased or ordered by the user. Server encryption key module 205 may write an identifier of the user device 104 to the profile before the device is shipped to the user.

At block 630, method 600 identifies a shared secret key associated with the user device 104 identified at block 620. In one embodiment, the shared secret key may be obtained from a subscriber identity module (SIM) stored on a SIM card 275 of user device 104. In other embodiments, the shared secret key may be communicated from the user device 104 to the digital content providing server 125 at some point in time, such as when registering the user device 104. In another embodiment, the shared secret key may be chosen from a set of possible values according to a policy known to both user device 104 and content providing server 125. In one embodiment, the policy may define an order that they keys are to be used in, such that a different value is used as the shared secret key for each subsequent media data request on a rotating basis. The policy may also select a value for shared secret key 245 depending on some factor, such as time or location. At block 640, method 600 may store the shared secret key and/or the key policy in the server profile generated at block 610. The server profile may be identified by a profile number that can be used to access the profile when a request for electronic media data is later received from the user device 104.

Figure 7:
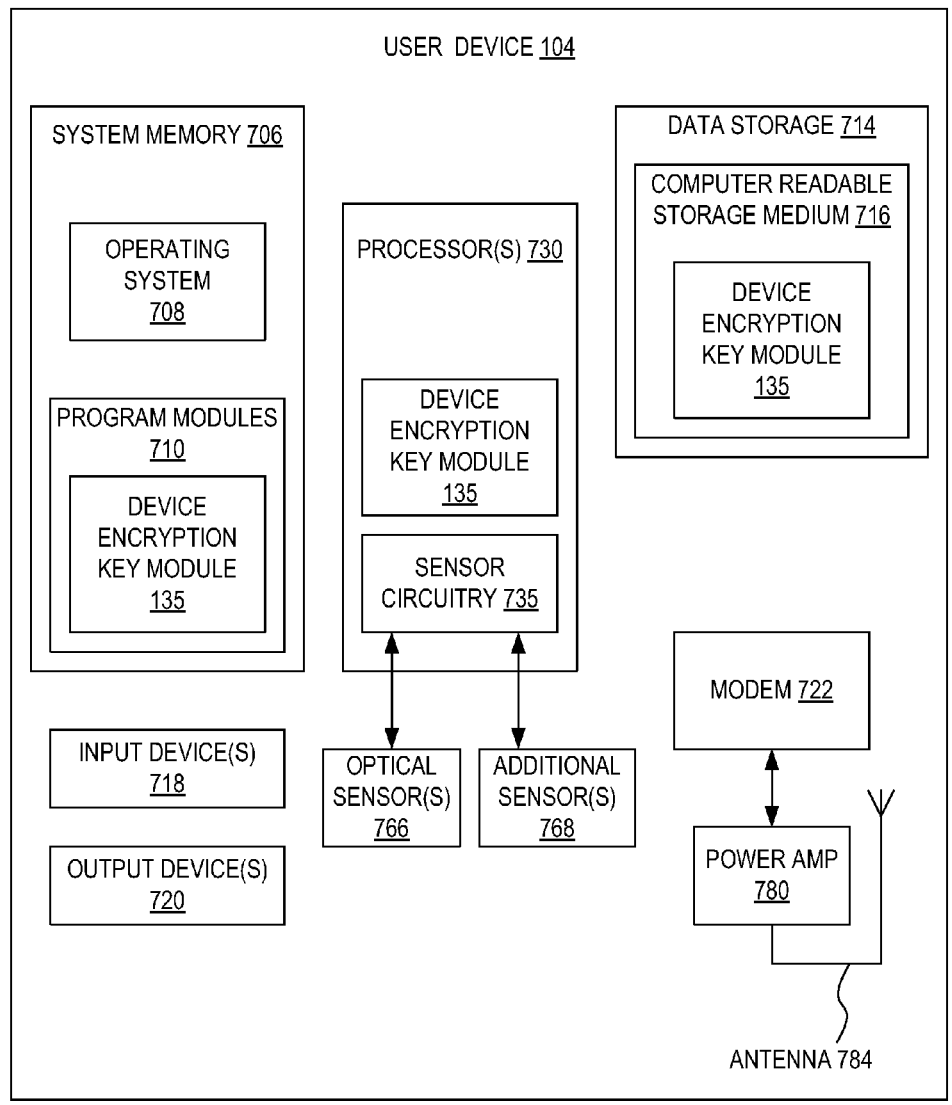
FIG. 7 is a block diagram illustrating an exemplary user device, according to an embodiment.

FIG. 7 is a block diagram illustrating an exemplary user device 104. In one embodiment, the user device 104 may correspond to one or all of the user devices 102, 104 of FIG. 1 and may be any type of user device such as an electronic book reader, a PDA, a mobile phone, a laptop computer, a portable media player, a tablet computer, an electronic pad, a desktop computer, a camera, a video camera, a netbook, and the like.

The user device 104 includes one or more processors 730, such as one or more CPUs, microcontrollers, field programmable gate arrays, or other types of processors. The user device 104 also includes system memory 706, which may correspond to any combination of volatile and/or non-volatile storage mechanisms. The system memory 706 stores information which provides an operating system component 708, various program modules 710 such as device encryption key module 135, and/or other components. The user device 104 performs functions by using the processor(s) 730 to execute instructions provided by the system memory 706.

The user device 104 also includes a data storage device 714 that may be composed of one or more types of removable storage and/or one or more types of non-removable storage. The data storage device 714 includes a computer-readable storage medium 716 on which is stored one or more sets of instructions embodying any one or more of the methodologies or functions described herein. As shown, instructions for the device encryption key module 135 may reside, completely or at least partially, within the computer readable storage medium 716, system memory 706 and/or within the processor(s) 730 during execution thereof by the user device 104, the system memory 706 and the processor(s) 730 also constituting computer-readable media. In one embodiment, data storage 714 includes data store 240 of FIG. 2. The user device 104 may also include one or more input devices 718 (keyboard, mouse device, specialized selection keys, etc.) and one or more output devices 720 (displays, printers, audio output mechanisms, etc.).

The user device 104 further includes a wireless modem 722 to allow the user device 104 to communicate via a wireless network (e.g., such as provided by the wireless communication system) and/or with other computing devices, such as remote computers, the item providing system, online book stores, electronic catalogs for libraries, and so forth. The wireless modem 722 may allow the user device 104 to handle both voice and non-voice communications (such as communications for text messages, multimedia messages, media downloads, web browsing, etc.) with the wireless communication system 110. The wireless modem 722 may provide network connectivity using any type of mobile network technology including, for example, cellular digital packet data (CDPD), general packet radio service (GPRS), enhanced data rates for GSM evolution (EDGE), universal mobile telecommunications system (UMTS), 1 times radio transmission technology (1xRTT), evaluation data optimized (EVDO), high-speed downlink packet access (HSDPA), WiFi, etc. The wireless modem 722 may generate signals and send these signals to power amplifier (amp) 780 for amplification, after which they are wirelessly transmitted via antenna 784. In addition to sending data, antenna 784 also receives data, which is sent to wireless modem 722 and transferred to processor(s) 730.

In one embodiment, user device 104 includes an optical sensor 766. The optical sensor 766 may be a low resolution camera (e.g., having 0.2 or 0.3 Megapixels) that takes images (e.g., of a user's eyes) on a periodic basis. Alternatively, the optical sensor 766 may have a higher resolution, such as 1 Megapixel up to 10 or more Megapixels. The optical sensor 766 may be positioned such that images are taken of a user's face while the user holds the user device 104 in front of his face in a standard reading position. Therefore, the optical sensor 766 may be used to track user eye movement during reading.

In one embodiment, user device 104 includes one or more additional sensors 768 such as a physical contact sensor, close proximity sensors, or motion sensors. The sensors 768 can detect the presence of human body parts, and convey information regarding the detected presence to processor(s) 730. In one embodiment, the sensors 768 may be capacitive sensors that are configured to measure capacitance generated by the presence of the human body part using any one of various techniques known in the art, for example, relaxation oscillation, a current verses voltage phase shift comparison, resistor-capacitor charge timing, capacitive bridge division, charge transfer, sigma-delta modulation, or charge-accumulation. In an alternative embodiment, the sensors 768 may also be optical (e.g., infrared) sensors that use an emitter and receiver pair to detect the presence of opaque objects. Alternatively, the sensors 768 may be inductive sensors, which include an inductive loop. When the presence of a human body part (or metal object) is brought close to the inductive sensor, an induction of the inductive loop changes, causing the human body part to be detected. Alternatively, the sensors 768 may be ultrasonic sensors that emit an ultrasonic signal and measure a time duration between when a signal is transmitted and the reflection of that signal received (a.k.a., flight response). The sensors 768 may also include other types of sensors, such as those that operate using the detection principles of resistive (e.g., analog resistive, digital resistive or residual resistive), surface acoustic wave, electromagnetic, near field imaging, or other technologies. In one embodiment, multiple different types of sensors are used. Though the detected object is described herein as a human body part, other types of objects may also be detected depending on the sensing technologies used.

In one embodiment, the additional sensors 768 include a motion sensor, such as an accelerometer or one or more gyroscopes. The user device 104 may use motion data from motion sensors to determine whether a user is holding the user device 104. For example, if the user device 104 experiences constant minor accelerations, it may be determined that the user device 104 is being held in a user's hand. Additionally, if the user device 104 is at a particular angle (detectable based on acceleration readings from an accelerometer), it may be determined that the user device 104 is being rested on a user's leg during reading.

The processor(s) 730 may include sensor circuitry 735 (e.g., sensor device drivers) that enables the processor(s) 730 to interpret signals received from the optical sensor(s) 766 and/or additional sensors 768. In one embodiment, the optical sensors 766 and/or additional sensors 768 output raw sensor data. In another embodiment, the optical sensors 766 and/or additional sensors 768 output fully processed signals to the processor(s) 730. For example, the additional sensors 768 may output a user contact/no user contact signal using a single line interface or a multi-line interface. In another embodiment, the additional sensors 768 output, for example, positional data and/or object presence data (e.g., of a human body part) to the processors 730 without first processing the data. In either instance, the processors 730 may use the sensor circuitry 735 to process and/or interpret the received data. If data is received from multiple sensors, processing the data may include averaging the data, identifying a maximum from the data, or otherwise combining the data from the multiple sensors.

Figure 8:
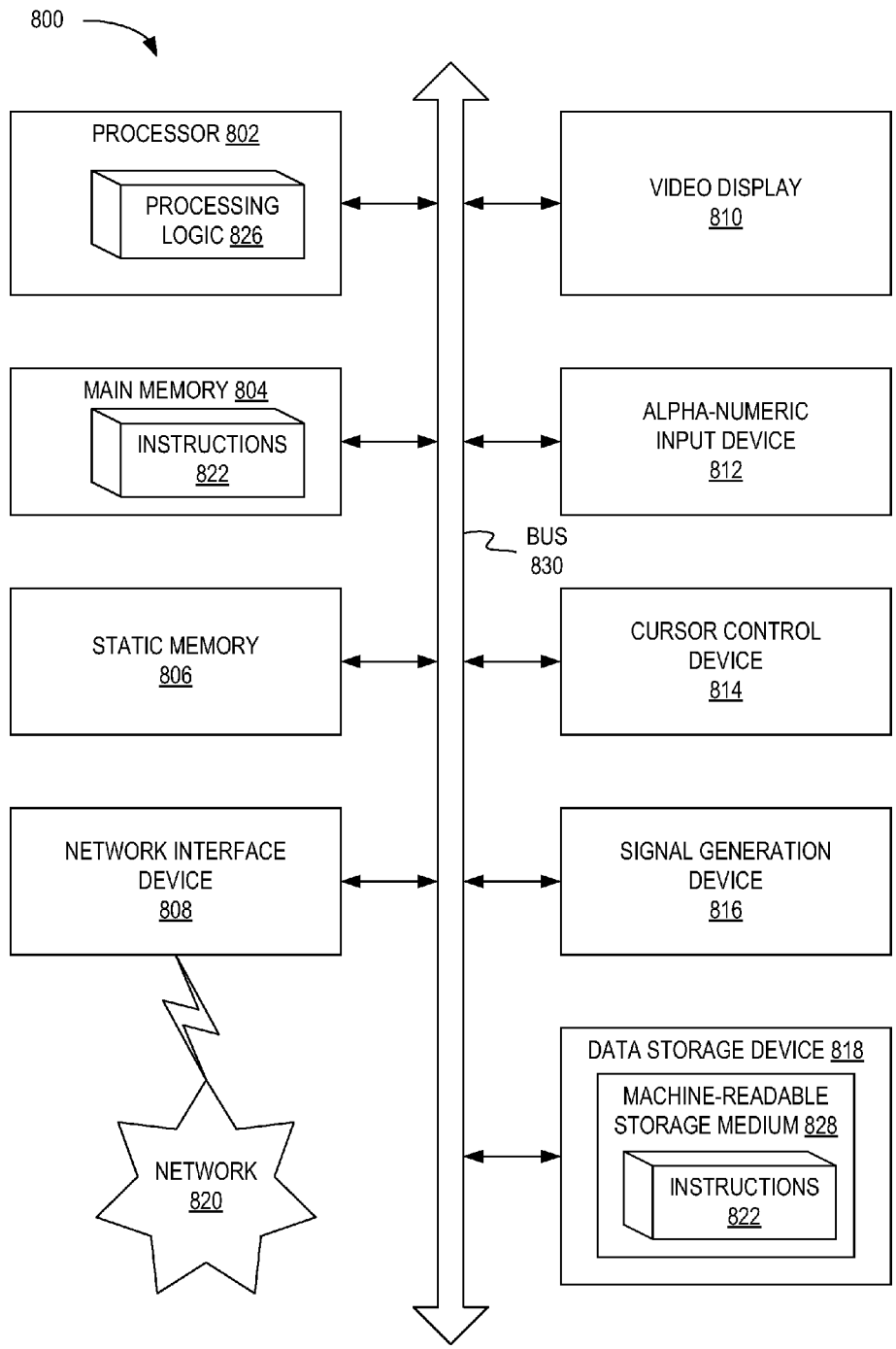
FIG. 8 is a block diagram illustrating one embodiment of a computer system, according to an embodiment.

FIG. 8 illustrates a diagrammatic representation of a machine in the exemplary form of a computer system 800 within which a set of instructions, for causing the machine to perform any one or more of the methodologies discussed herein, may be executed. The system 800 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 800 may represent digital content providing server 125 of FIG. 1.

The exemplary computer system 800 includes a processing system (processor) 802, a main memory 804 (e.g., read-only memory (ROM), flash memory, dynamic random access memory (DRAM) such as synchronous DRAM (SDRAM)), a static memory 806 (e.g., flash memory, static random access memory (SRAM)), and a data storage device 818, which communicate with each other via a bus 830.

Processor 802 represents one or more general-purpose processing devices such as a microprocessor, central processing unit, or the like. More particularly, the processor 802 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 802 may also be one or more special-purpose processing devices such as an application specific integrated circuit (ASIC), a field programmable gate array (FPGA), a digital signal processor (DSP), network processor, or the like. The processor 802 may be configured to execute the server encryption key module 127 for performing the operations and steps discussed herein.

The computer system 800 may further include a network interface device 808. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 816 (e.g., a speaker).

The data storage device 818 may include a computer-readable medium 828 on which is stored one or more sets of instructions 822 (e.g., instructions of server encryption key module 127) embodying any one or more of the methodologies or functions described herein. The instructions 822 may also reside, completely or at least partially, within the main memory 804 and/or within processing logic 826 of the processor 802 during execution thereof by the computer system 800, the main memory 804 and the processor 802 also constituting computer-readable media. The instructions may further be transmitted or received over a network 820 via the network interface device 808.

While the computer-readable storage medium 828 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "identifying", "adding", "selecting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method, comprising:

receiving, at a content providing server, a request from a user device to stream electronic media data from the content providing server to the user device, wherein the request comprises an identifier of a predefined shared secret key and a device public key;

generating a server public key;

identifying, by a processor, the predefined shared secret key corresponding to a key from a subscriber identity module (SIM) in the user device, wherein the predefined shared secret key is used for encryption of data, and wherein the shared secret key is retrieved from a server profile in the content providing server using the received identifier of the shared secret key;

generating a server private key based on the server public key and the predefined shared secret key;

encrypting the requested electronic media data based on the server private key and the device public key; and providing the encrypted electronic media data to the user device.

2. The method of claim 1, wherein the shared secret key is determined according to a shared secret key policy.

3. The method of claim 2, wherein the shared secret key policy comprises a plurality of keys and a defined order that the keys are to be used for subsequent requests on a rotating basis.

4. The method of claim 2, wherein the shared secret key policy selects the shared secret key from a plurality of keys based on a time the request was made.

5. The method of claim 2, wherein the shared secret key policy selects the shared secret key from a plurality of keys based on a location from which the request was made.

6. The method of claim 1, wherein the server public key comprises a human readable string of concatenated information, the information comprising an identifier of a content providing server, an identifier of an application on the user device making the request, an identifier of the requested electronic media data, and an indication of a time the request was received.

7. The method of claim 1, wherein generating the server private key comprises combining the server public key and the shared secret key using an elliptic curve operation.

8. The method of claim 1, wherein the identifier of the shared secret key comprises an identifier of the profile where the shared secret key is stored on the content providing server.

9. The method of claim 1, further comprising:
generating a traffic encryption key from the server private key and the device public key.

10. The method of claim 9, wherein generating the traffic encryption key comprises combining the server private key and the device public key using a key exchange algorithm.

11. The method of claim 9, wherein encrypting the electronic media data comprises encrypting the electronic media data with the traffic encryption key.

12. A system, comprising:
a processor; and
a memory operatively coupled to the processor, the memory storing a device encryption key module, executed from the processor and the memory, the device encryption key module configured to:
generate a device public key;
determine a predefined shared secret key;
generate a device private key based on the device public key and the predefined shared secret key;
send a request for electronic media data to a content providing server, wherein the request comprises an identifier of the predefined shared secret key;
receive, from the content providing server, a server public key and the requested electronic media data in an encrypted form, wherein the requested electronic media data is encrypted based on the predefined shared secret key, and wherein the content providing server identifies the shared secret key from a server profile using the received identifier of the shared secret key; and
decrypt the received electronic media data using the device private key and the server public key.

13. The system of claim 12, wherein determining the predefined shared secret key comprises reading the key from a secure location.

14. The system of claim 13, wherein the secure location comprises a subscriber identity module (SIM) in a user device.

15. The system of claim 12, wherein the shared secret key is determined according to a shared secret key policy.

16. The system of claim 15, wherein the shared secret key policy comprises a plurality of keys and a defined order that the keys are to be used for subsequent requests on a rotating basis.

17. The system of claim 15, wherein the shared secret key policy selects the shared secret key from a plurality of keys based on a time the request was made.

18. The system of claim 15, wherein the shared secret key policy selects the shared secret key from a plurality of keys based on a location from which the request was made.

19. The system of claim 12, wherein the device public key comprises a human readable string of concatenated information, the information comprising an identifier of a user making the request, an identifier of an application used to stream the electronic media data, an identifier of the electronic media data, an indication of the time the request was made, and an identifier of the user device making the request.

20. The system of claim 12, wherein generating the device private key comprises combining the device public key and the shared secret key using an elliptic curve operation.

21. The system of claim 12, further comprising:
identifying a server public key from the content providing server.

22. The system of claim 21, wherein identifying the server public key comprises receiving the server public key from the content providing server.

23. The system of claim 21, wherein identifying the server public key comprises estimating the server public key based on a known key format.

24. The system of claim 21, wherein the device encryption key module is further configured to:
generate a traffic encryption key from the device private key and the server public key.

25. The system of claim 24, wherein generating the traffic encryption key comprises combining the device private key and the server public key using a key exchange algorithm.

26. The system of claim 24, wherein the traffic encryption key is used to decrypt the encrypted electronic media data received from the content providing server.

27. A non-transitory computer-readable storage medium storing instructions which, when executed, cause a processor to perform a method comprising:
receiving, at a content providing server, a request for electronic media data from a user device, wherein the request comprises an identifier of a predefined shared secret key and a device public key;
generating a server public key;
generating a server private key from the server public key and the predefined shared secret key; and
encrypting, by the processor in content providing server, the electronic media data using the server private key and the device public key, wherein the content providing server does not exchange the shared secret key with the user device, and wherein the shared secret key is retrieved from a server profile in the content providing server using the received identifier of the shared secret key.

28. The non-transitory computer-readable storage medium of claim 27, wherein the predefined shared secret key is one of a plurality of keys stored in a secure location.

29. The non-transitory computer-readable storage medium of claim 28, wherein the secure location comprises a subscriber identity module (SIM) in the user device.

30. The non-transitory computer-readable storage medium of claim 29, wherein the user device is provided by a same entity that manages the content providing server.

31. The non-transitory computer-readable storage medium of claim 29, wherein encrypting the electronic media data comprises:
   combining the server public key and the shared secret key using an elliptic curve operation to generate a server private key;
   combining the server private key and the device public key using a key exchange cryptography technique to generate a traffic encryption key; and
   encrypting the requested electronic media data using the traffic encryption key.

32. The non-transitory computer-readable storage medium of claim 27, wherein the electronic media data comprises digital video data.

33. The non-transitory computer-readable storage medium of claim 32, wherein the digital video data is streamed over a wireless network from the content providing server to the user device.

34. A method comprising:
   generating a device public key;
   determining, by a processor in a user device, a predefined shared secret key from a subscriber identity module (SIM) in the user device, wherein the predefined shared secret key is used for encryption of data;
   generating a device private key based on the device public key and the predefined shared secret key;
   sending, to a content providing server, a request to stream electronic media data to the user device, wherein the request comprises an identifier of the predefined shared secret key;
   wirelessly receiving a server public key and the requested electronic media data from the content providing server, wherein the electronic media data is encrypted based on the predefined shared secret key, and wherein the content providing server identifies the shared secret key from a server profile using the received identifier of the shared secret key; and
   decrypting the electronic media data using the device private key and the server public key.

35. The method of claim 34, wherein the decrypting comprises:
   combining the device public key and the shared secret key using an elliptic curve operation to generate the device private key;
   combining the device private key and a server public key using a key exchange cryptography technique to generate a traffic encryption key; and
   decrypting the received electronic media data using the traffic encryption key.

* * * * *